United States Patent

Myers

[15] 3,635,247

[45] Jan. 18, 1972

[54] CAGE VALVE WITH MULTIPURPOSE RING

[72] Inventor: Edward B. Myers, Oreland, Pa.

[73] Assignee: Honeywell Inc., Minneapolis, Minn.

[22] Filed: Jan. 28, 1970

[21] Appl. No.: 6,509

[52] U.S. Cl. ........................................................137/625.5
[51] Int. Cl. .....................................................F16k 11/00
[58] Field of Search ..........................251/362, 282, 361, 360; 137/625.5, 625.69, 625.48

[56] References Cited

UNITED STATES PATENTS

| | | | |
|---|---|---|---|
| 1,204,954 | 11/1916 | Davison | 251/282 X |
| 2,227,542 | 1/1941 | Grove | 251/362 |
| 2,897,836 | 8/1959 | Peters et al. | 251/282 X |
| 2,980,139 | 4/1961 | Lynn | 251/282 X |
| 3,038,499 | 6/1962 | Dumm | 251/282 X |
| 3,063,469 | 11/1962 | Freeman | 137/625.5 X |
| 3,123,091 | 3/1964 | Elsey | 137/625.5 X |
| 3,188,048 | 6/1965 | Sutherland | 137/625.5 X |
| 3,287,022 | 11/1966 | Soechting | 137/625.69 X |

*Primary Examiner*—Samuel Scott
*Attorney*—Arthur H. Swanson, Lockwood D. Burton and John Shaw Stevenson

[57] ABSTRACT

A three-way valve, having (1) a unitary balanced plug, (2) a pair of stacked cages each having an inverted cone-shaped end for engaging separate wedge-shaped ring seals to move them outwardly and into sealing contact with the valve body and (3) a unique ring member to apply a biasing force on the cage to permit the caged parts to expand without becoming distorted when the temperature of the fluid passing through the valve is increased or decreased and to also maintain the ring seals in fluidtight sealing contact with the valve body before, during and after the changes in temperature of the fluid.

10 Claims, 12 Drawing Figures

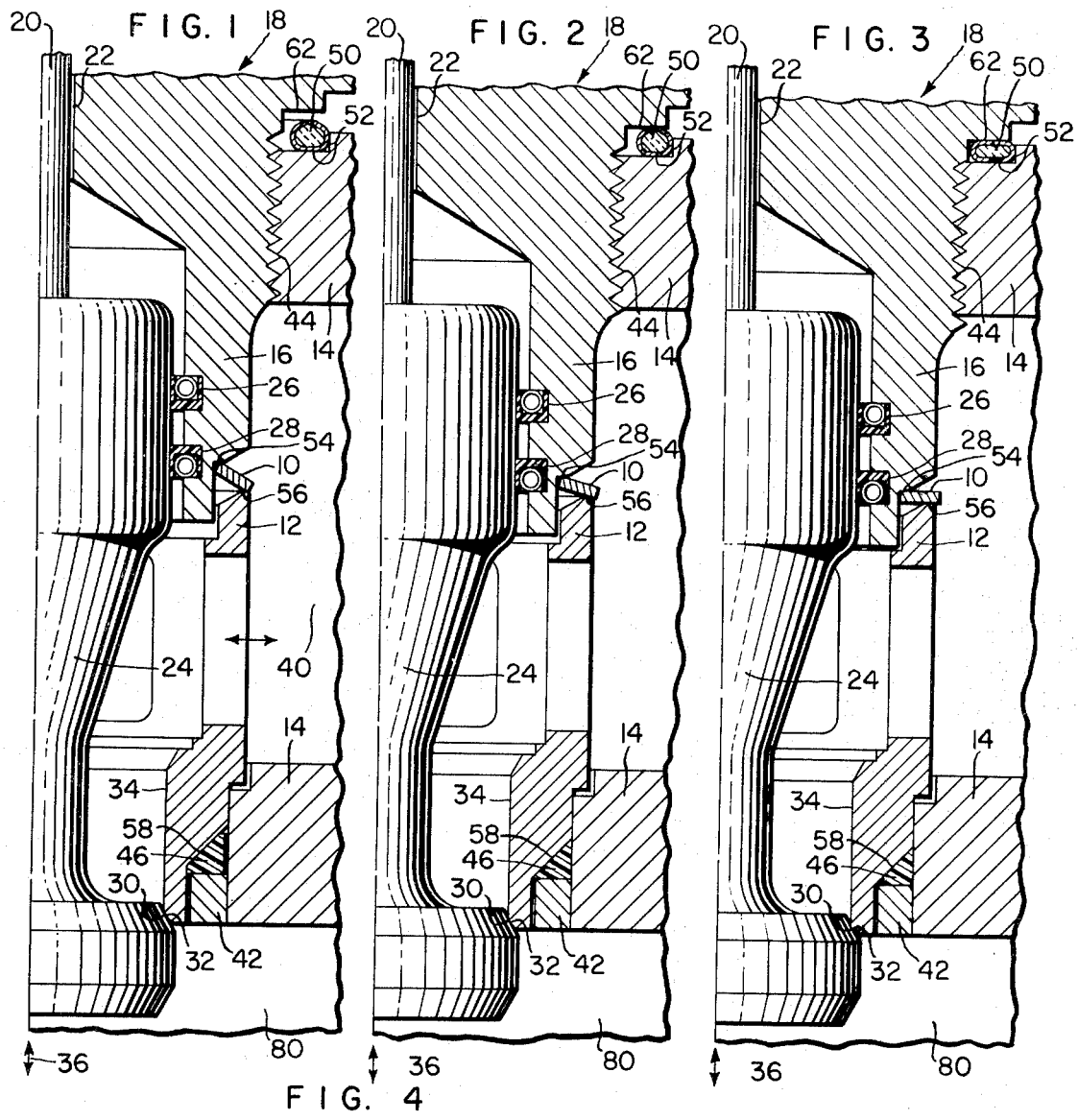
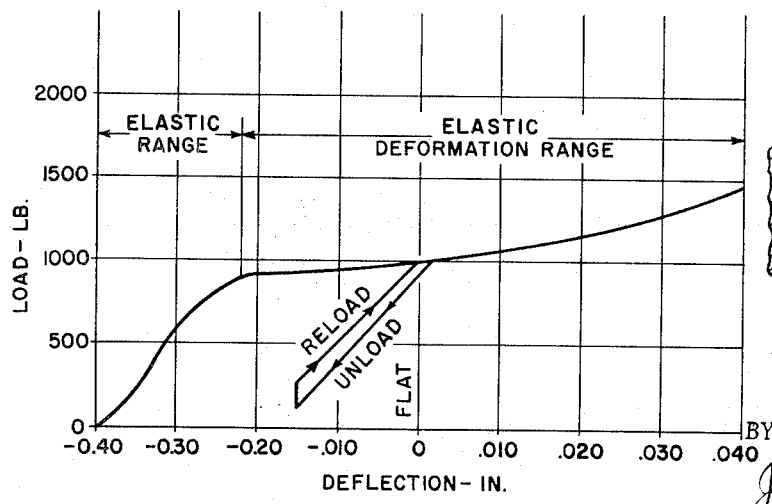
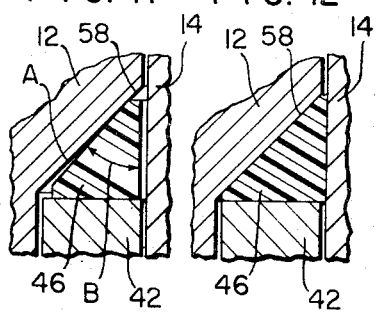
INVENTOR.
EDWARD B. MYERS
BY John Shaw Stevenson
AGENT.

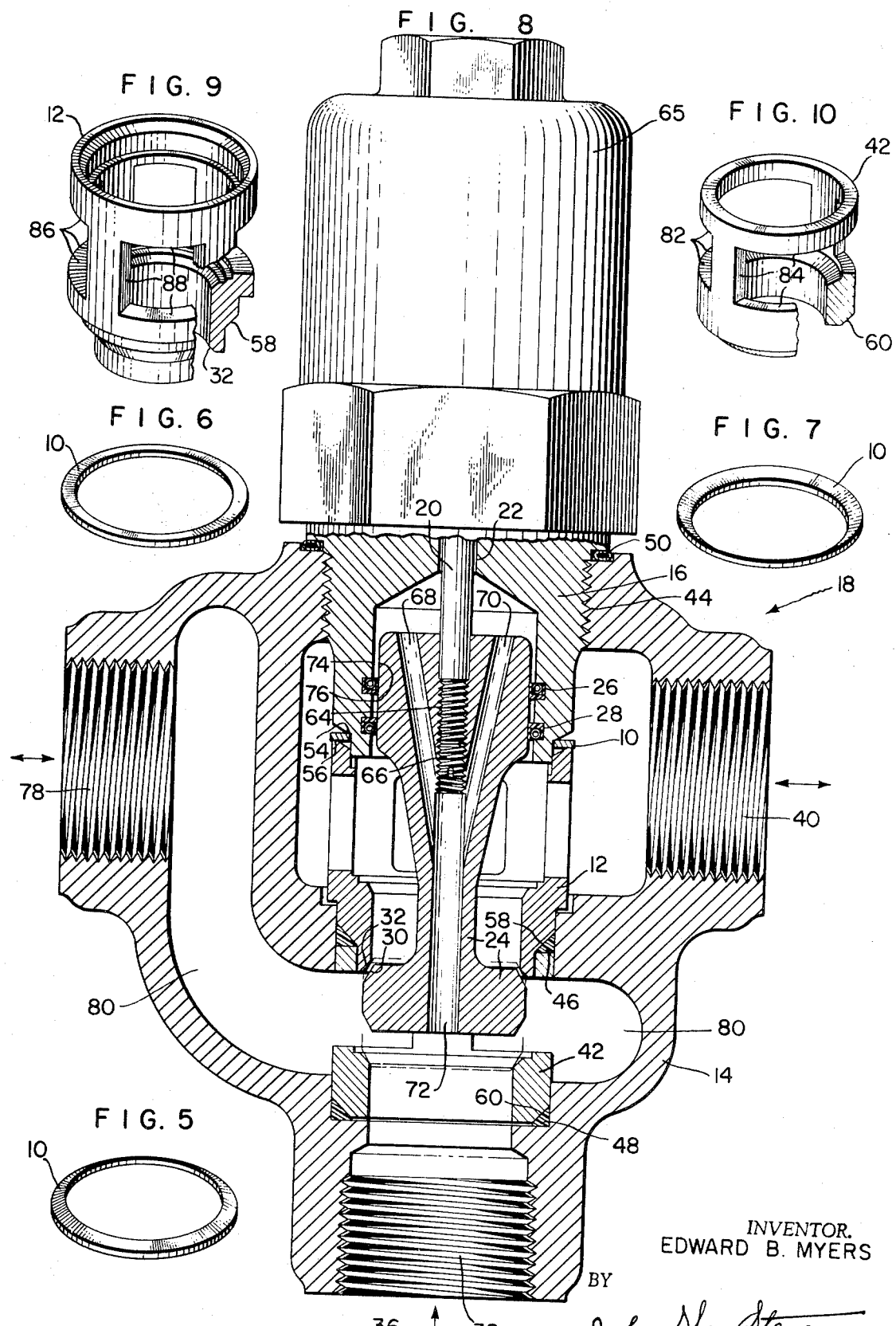

CAGE VALVE WITH MULTIPURPOSE RING

It is an object of the present invention to provide a three-way diverting valve having a first cage against which a first contacting surface of a unitary valve plug can be moved into sealing contact in order to allow a flow of fluid passing in one direction through an inlet portion in the body of the valve to pass through and out of a first outlet passageway in the body and to further provide a second cage against which a second contacting surface of the plug can be moved into seating contact in order to allow the flow direction of the fluid to be changed so that it will flow from the inlet port through the body of the valve and thence to, through and out of a second outlet passageway in the body.

It is another object of the present invention to provide a three-way diverting valve of the aforementioned type that will allow the flow of fluid passing therethrough to be directed in a reverse direction from that previously described.

It is another object of the present invention to provide a characterized dual cage and unitary plug construction for a three-way diverting valve that will enable the flow of the fluid passing therethrough to always exert a force on the plug in a direction that will tend to retain it in either of the aforementioned different cage seated positions to which the plug has been moved by an actuator.

It is still another object of the present invention to provide a balanced dual cage and a unitary plug having characterized passageways extending between its top and bottom surfaces for the aforementioned three-way diverting valve which will enable the same pressure of fluid passing therethrough to be applied simultaneously to surface areas located on the top and the bottom seating surface of the plug that are of the same size so that the plug will always be maintained in a balanced position during drops or increases which occur in the differential pressure of the inlet and outlet fluid associated with this valve.

It is still another object of the present invention to provide a three-way diverting valve of the aforementioned type which can, because of its self-balanced unitary plug construction, employ an unusually small size power-actuating means to move it.

One of the difficulties heretofore encountered in selling unbalanced three-way valves of the large size variety has been the high cost and enormous size actuators that were required to be used with these valves in order to get sufficient power to actuate these plugs from one position to another. Sale of these valves have been limited to installation areas where space was no problem. They could not be employed in the majority of installations where these high costs were inhibited and/or where limited amount of space for installation of these valves were required.

It is thus another object of the invention to provide the aforementioned unitary balanced plug feature for these three-way valves so that larger size valves of this type can be provided without requiring any substantial increase in the size or weight required for the actuator.

It is another object of the present invention to provide a two-cage unitary plug three-way diverting valve structure whose trim can be rapidly removed, repaired and replaced without removing the body of the valve from the process flow line in which it is installed and thereby incur a reduction in the cost of maintaining the valve in good working order.

It is still another object of the present invention to provide a unitary plug, two-cage three-way diverting valve structure having a separate one of two-ring gaskets purposely constructed of a triangular cross-shaped configuration for compressing by the movement of a bonnet and a compressed truncated cone-shaped ring into a long life, nondistortable, leakproof position between the lower end of the lowermost cage and an inner wall of the body and between the two cages and another inner wall of the body.

It is another object of the present invention to provide a unitary plug, two cage, three-way valve whose construction will enable a compressed truncated cone-shaped ring to be inserted between a characteristically shaped inner end of a bonnet and a characteristically shaped top surface of the uppermost one of the two cages to thereby allow the ambient temperature of the fluid which is passing through the valve and its resulting expansion of the valve parts to occur without these parts being brought into permanently distorted contact with one another.

It is another object to provide a compressed truncated cone-shaped ring of the aforementioned type which has a plastically deformable range that will enable the final tightening of the bonnet into the body to compress a gasket in sealed relation against the top of the valve without distorting the aforementioned triangular shaped seals.

A better understanding of the present invention may be had from the following detailed description when read in conjunction with the accompanying drawings in which:

FIG. 1 is a typical partial cross-sectional view of a cage valve showing the truncated shaped condition of the multipurpose force ring during the completion of the initial partially assembled stage and after the bonnet of the valve has been manually adjusted to an initial hand tightened position and also while the aforementioned seals associated with this valve remain in a nonloaded unsealed condition;

FIG. 2 is a typical partial cross-sectional view of a cage valve showing the force ring in a second partially assembled position in which it has been partially moved by further tightening of the bonnet toward its inverted truncated cone position while passing through its elastic range so that the inherent spring characteristics of the ring at this stage of assembly will retain the required load on a lower one of the seals to retain it in a sealed condition between the cage and the body of the valve regardless of the manufacturing tolerances of the bored out part of the body and differences in trim parts of the valve;

FIG. 3 is a typical cross-sectional view of a cage valve showing the force ring in a third assembled position in which the ring has been moved by further tightening of the bonnet away from its elastic range of operation into a range where it is in its plastically deformed range wherein tightening of the bonnet can occur without the ring introducing a rupturing load on the lower seal or on the upper seal which latter seal has been moved by the bonnet into contact with the top surface of the body;

FIG. 4 shows the elastic range over which the ring allows a load versus deflection to occur between the bonnet and the cage during the initial step in assembling the cage valve at the left end of the chart and further shows the range over which the ring will transmit a desired plastic deformation without any substantial increase in load between the bonnet and the cage during the final steps in assembling this cage valve;

FIG. 5 is a view of the truncated cone-shaped ring before it is assembled in the valve;

FIG. 6 is a view of the aforementioned ring when it is moved to the assembled position shown in FIG. 2;

FIG. 7 is a view showing the maximum inverted truncated cone shaped position to which the ring may be moved after it has reached its plastic deformation range condition as shown in FIG. 3;

FIG. 8 shows the ring in an assembled condition in a three-way valve that has two cages that are each seated on triangular sealing rings;

FIG. 9 shows the first one of two cages employed in the three-way valve shown in FIG. 8;

FIG. 10 shows the other one of the two cages that are employed in the three-way valve of FIG. 8;

FIG. 11 shows the loose unsealed condition of the single triangular ring seal during the initial assembly of the cage valve as shown in FIG. 1 in enlarged form; and FIG. 12 shows how the triangular seal is retained in the desired nondeformable position when the multipurpose ring has been moved to its finally assembled position such as is shown in FIGS. 3 and 8.

Referring now to the drawings in detail there is shown in FIG. 1 a typical application wherein the aforementioned unique multipurpose truncated conical ring member 10 can be advantageously employed between a first part, such as a cage 12 that is mounted in a stationary member 14 and a means in the form of a bonnet 16 mounted for movement in the stationary member which forms a body 14 of a cage valve 18.

The ring 10 is preferably constructed of a 18–8 stainless steel material or any other material that would give the characteristics that is shown in FIG. 4. In order to obtain the characteristics shown in FIG. 4 it has been found to be advantageous to initially prepare the ring for use by compressing it from its initial truncated cone shape position shown in FIG. 5 into its inverted truncated cone shape position shown in FIG. 7 and to then reverse the position of the ring in the press so it can be pressed in the opposite direction.

The valve 18 is shown in FIG. 1 as having a stem 20 slidably mounted for reciprocal movement with respect to the surface 22 of the bonnet 16. The valve plug 24 is fixedly connected for joint reciprocal movement with the stem at its lower end. The plug 24 in turn is slidably mounted in ring bearings 26, 28 that are mounted as shown in the bonnet 16. The plug 24 is provided with a tapered seating surface 30 for engagement with the lower inner cylindrical edge 32 of the cage 12 so that the passageway formed by the inner wall of the cage 34 can be cut off and a flow of fluid in the direction of the arrows 36 prevented from passing between a first passageway 38 and a second passageway 40.

Although the ring 10 as shown in FIGS. 1 and 8 as being employed in a three-way cage valve having two cages 12 and 42 as shown in detail in FIGS. 9 and 10 it should be understood that this ring can be beneficially employed between a bonnet and a single cage in a two-way cage valve that is required to retain a fixed pressure on a single seal during ambient temperature expansion of these parts. It can be used advantageously in other similar structures where, for example, either expansion due to ambient temperature of two mating parts would otherwise cause abutment and deformation to occur between these parts or wherein, one, or both of these parts must apply a substantially constant pressure to a single seal to retain it in a fluidtight position without distorting the seal upon an increase in ambient temperature of these parts.

The aforementioned ring 10 can also be beneficially employed to compensate for a condition wherein undesired manufacturing tolerances exists between one or both of these parts or in a bored out housing into which these parts are assembled.

It can be seen that the truncated cone shape ring 10 shown in FIG. 5 is inserted into the housing 14 and the lower flat surface of the bonnet 16 is manually rotated and moved in a downward direction by means of its threaded connection 44 with the body 14 to a hand tightened position as shown in FIG. 1.

Under the FIG. 1 initial assembly stage the triangular-shaped ring seal 46 shown in FIGS. 1 and 8 and another identical triangular seal 48 shown in FIG. 8 will be retained by the elastic spring 10 in its loose nonsealing condition between the respective associated cages 12, 42 and their respective cage 42 and stationary body part 14 of the cage valve 18. Under this FIG. 1 initial stage of assembly the commercially available seal 50 which is preferably of a metal clad asbestos-filled ring is in a nonsealed condition between the bonnet 16 and the surface 52 forming a recess wall portion on the top surface of the body 14.

As a wrench, not shown, is employed to increase the load applied by the horizontal surface 54 of bonnet 16 to the inner smallest diametral portion of the ring 10 as shown in FIG. 2 the outer larger diametral portion of the ring 10 will transfer and increasing amount of force in a downward direction to the upper horizontal portion 56 of the cage 12 by the amount shown by way of an example in the charted elastic range as shown in FIG. 4 for this ring 10.

Under this FIG. 2 or second stage of assembly the previously mentioned triangular seals 46, 48 shown in FIG. 8 will have been moved outward by the downward force of the lower chamfered peripheral ends 58, 60 of the cages 12, 42 into sealed tight engagement between their respective associated cages 12, 42 and their respective associated cage 42 and stationary body parts 14 of the cage valve 18.

Under FIG. 2 or the second stage of assembly the surface 62 of the bonnet 16 will have been moved downward to a position in which it is almost in contact with the seal 50. During the time in which the bonnet 16 is moved downward from its second or FIG. 2 position toward the FIG. 3 position the shape of the multipurpose ring 10 will be moved in a direction from its initial truncated cone shape towards a position in which it is of an inverted truncated cone shape. During the movement of the bonnet from the FIG. 2 to FIG. 3 position the inherent elastic characteristics of the multipurpose ring 10 will shift from one which transfers increasing loads applied to it by the bonnet into proportional increases in the force on the cages 12, 42 and seals 46, 48 to one which possesses plastic deformation characteristics in which further downward loading movement of the bonnet and the resulting deflection of the ring 10 can take place without the ring transferring a substantial increase in load to the cages 12, 42 and seals 46, 48 that it did when it was being operated in its FIG. 1 and FIG. 2 positions and in the elastic ring shown in FIG. 4.

It can also be seen that when the bonnet has been moved downward to its FIG. 3 position the seal 50 will be compressed into a desired good sealing relationship between the bonnet surface 62 and the recess surface 52 in the body of the valve 18. This last mentioned sealing action prevents the trim parts which have any number of differences in manufacturing tolerances to be assembled in a uniform manner in the valve and with uniform sealing pressure acting on the seals.

It should be noted that without having a unique multipurpose ring 10 which initially has an inherent elastic range characteristics and a latter deformable plastic range characteristic it would be impossible for the seals 46, 48 to otherwise be assembled without being distorted by downward movement of the bonnet 16.

It can be seen by observing FIG. 4 that after the load of the bonnet has been increased and the ring has been moved from its truncated cone-shaped position to its flat or horizontal position that the load of the bonnet acting on the ring 10 can be rapidly unloaded and reloaded.

The stationary zero load −0.040 inch deflection point on the chart shown in FIG. 4 indicates the condition that the ring 10 will be in during the FIG. 1 condition or a condition immediately after the bonnet has been threadedly rotated into a handtight position against the ring 10.

The last plotted point on the right end of the chart indicates the load deflection characteristics of the ring when it has been moved from its initial truncated cone-shaped position into its fully deflected inverted cone-shaped position.

It should be noted that each of the triangular-shaped ring seals 46, 48 are constructed and placed into their final assembled positions as is shown for the seal 46 in FIGS. 11 and 12. The angle A shown in FIG. 11 is 45° and the angle B of each of the seals 46, 48 is made of a smaller angle namely 44°.

It can be seen that when the chamfered end portions 58, 60 of the cages 12 and 42 shown in FIG. 8, 11, and 12 are moved from their nonloaded unsealed positions as shown in FIG. 11 to their previously described loaded seal position as shown in FIG. 12 the seal 46 will be moved outward against the body 14 and into fluidtight sealed contact with the lower end portion 58 of the cage 12 and the upper end of the lower cage 42.

The seal 48 will likewise be moved in a similar fluidtight sealing manner outward and downward against the body 14 and outward into contact with the lower end portion 60 of the lowermost cage 42.

The stem 20 of the plug 24 shown in FIG. 8 is threadedly connected at 64 to the plug and has a retaining shoe 66 positioned in the plug to retain the plug 24 and stem 20 in a fixed relation with one another as a fluid, not shown, is applied to the spring return piston-type actuator 65 that in turn is connected for movement with the other end of the stem 20.

The plug also has a pair of angularly positioned passageways 68 and 70 connected to and opening into a vertical passageway 72 to allow the same pressure of the fluid to be applied to the areas 74, 76; 30, 32 formed by the bonnet 16 and cage 42 along which the plug 24 is brought into engagement.

When the plug is in its lowermost dotted line position a fluid can flow from a flow line, not shown, but which is located at the left side passageway 78 of the three-way valve shown in FIG. 8 through the passageway 80 in the body 14 thru aperture-forming walls 82, 84 formed in a cage 42 thru aperture-forming walls 86, 88 formed in a cage 12 and out of the passageway 40. It can be seen that the fluid can also be directed in a reverse direction from that just described wherein it passes from passageway 40 to passageway 78.

When the lower end of the plug is in its uppermost outlined position the fluid can flow from a flow line, not shown, through the left side passageway 78 of the three-way valve, shown in FIG. 8, through the passageway 80 in the body through aperture-forming walls 82, 84 of the cage 42 and out the passageway 36.

It can be seen that the fluid can also be directed in a reverse direction from that just described wherein it passes from passageway 36 to passageway 78.

In any of the aforementioned conditions of the unitary plug it will always be maintained in a fully balanced position due to the previously described equal top and bottom trim areas along which the same fluid pressure is allowed to be applied thereto.

Experimentation has shown that under any of the aforementioned conditions of the unitary plug and/or under any condition in which the ambient temperature of the parts due to the hot temperature of the fluid passing through the valve extends through abnormally high and low temperatures, the valve will perform its functions without any distortion or leakage taking place at any of the seals 46, 48, 50, because of the unique arrangement of the multipurpose ring 10.

The embodiments of the invention in which an exclusive property or privilege is claimed are defined as follows:

1. A balanced three-way valve comprising a hollow body having an inlet and two outlet passageways, a cage means positioned within and in contact with said body at a location that is between the inlet and outlet passageways and having a pair of spaced-apart seating surfaces thereon, said cage means having a peripheral beveled end portion and a resilient seating ring forming a seal between the beveled end of the cage means and a body portion that is adjacent thereto, the outer periphery of the seating ring having a surface portion that is at a different inclined angle than the angle forming the beveled end of the cage, a means to jointly move said beveled end of the cage means into compressed engagement with the seating ring and the ring into compressed fluidtight engagement with said body with which the ring is in contact, a unitary plug mounted for movement into engagement with one or the other of the said seating surfaces to provide a way of diverting a flow of fluid from said inlet to a selected one of said outlet passageways, said plug having passageways extending between its top and bottom surfaces to allow the pressure of the fluid to be simultaneously applied to these surfaces and along equal areas thereof to maintain the plug in a balanced condition when said plug is in either one of said fluid flow diverting positions and while drops and increases occur between the pressure of the fluids that are passing into the inlet and flowing out of the outlet passageways.

2. The balanced three-way valve defined in claim 1 wherein said resilient seating ring is of wedge-shaped cross section and is loosely positioned within a wall of the body and at a position that is immediately under the beveled peripheral end portion of the cage means, said peripheral end portion formed by said beveled end of the cage means being inclined at a different angle than an inner inclined annular surface of said wedge-shaped ring, and wherein said beveled end portion of said cage means is moved into peripheral compressed engagement with the inclined surface of the wedge by said movable means to thereby provide a fluidtight seal between the external peripheral end portion of the cage and a wall of the body adjacent thereto.

3. The balanced three-way valve defined in claim 1 wherein the cage means is of a two-cage part construction, a peripheral end formed by said beveled end is positioned to form a base portion of the first of said two cages, said resilient seating ring is of wedge shape cross section and is positioned within the body between the body and said base portion, a second wedge-shaped seating ring is positioned within the body between the top end of the first cage and a bottom conical end of the second cage, the outside surface of said second cage is mounted in slidable contact with a portion of the wall that forms an inner surface of the body, said movable means is employed to simultaneously position the beveled peripheral end portion of the first cage into fluidtight engagement with the first wedge-shaped seating ring and the bottom end of the second cage and the top end of the first cage into fluidtight engagement with the second wedge-shaped seating ring and thereby provide fluidtight seals between the walls of the body and the ends of each of said cages.

4. The balanced three-way valve defined in claim 1 wherein the seating ring is of a wedge-shaped cross section and is loosely positioned within an inner wall of the body at a position that is immediately under the beveled end portion of the cage means, said beveled end portion of the cage means being positioned to form an inverted cone surface on a periphery of the cage means inclined at said different angle than the inclined surface formed on said wedge-shaped seating ring, and wherein said means is employed to move the beveled peripheral end portion of the cage means into peripheral compressed engagement with said inclined surface on the wedge-shaped seating ring to thereby provide a fluidtight seal between the external peripheral end portion of the cage means and a wall of the body adjacent thereto and wherein the angular difference that exists between the peripheral beveled end of said cage means and the angle at which said inclined surface is formed on the wedge-shaped seating ring, enables the movable means to force the wedge-shaped seating ring in an outward direction against said inner surface of the body.

5. The balanced three-way valve defined in claim 1 wherein the seating ring is of a resilient wedge-shaped cross section and is loosely positioned within a wall of the body and at a position that is immediately under a peripheral end portion formed by said beveled end of the cage means, said peripheral end portion of the cage means being inclined at a different angle than an inner inclined annular surface of said wedge-shaped ring, and said cage moving means is employed to move said beveled end portion of the cage means into peripheral compressed engagement with the inclined surface of the resilient wedge-shaped ring to thereby provide a fluidtight seal between the external peripheral end portion of the cage and a wall of the body and wherein said beveled shaped end of the cage and said inclined surface of the wedge differs from one another by substantially one degree.

6. The balanced three-way valve defined in claim 1 wherein the seating ring is of a resilient wedge-shaped cross section is loosely positioned within a wall of the body and at a position that is immediately under a peripheral end portion formed by said beveled end of the cage means, said peripheral end portion of the cage means being inclined at a different angle than an inclined peripheral surface of said wedge-shaped ring, and said cage-moving means is employed to move the beveled portion of the cage means into peripheral compressed engagement with the inclined surface of said wedge-shaped ring to thereby provide a fluidtight seal between the external peripheral end portion of the cage means and a wall of the body and wherein the difference in said beveled shaped angle of said cage means and the angle at which the inclined surface is formed on the wedge-shaped seating ring enables the material of the ring to be forced in an outward direction against said inner surface of the body during said movement of the movable means and wherein the angular difference in said beveled shaped end of each cage and the said inclined surfaces of each of their associated wedges is substantially one degree.

7. The balanced three-way valve defined in claim 1 wherein the seating ring is of a wedge-shaped cross section loosely positioned within a wall of the body and at a position that is immediately under a peripheral end portion formed by said beveled end of the cage means, said peripheral end portion of the cage means being inclined at a different angle than an inclined peripheral surface forming said wedge-shaped ring, and said cage-moving means is employed to move the beveled end portion of the cage means into peripheral compressed engagement with the inclined surface of the wedge to thereby provide a fluidtight seal between the external peripheral end portion of the cage means and a wall of the body and wherein said beveled shaped end of the cage is at a substantially 45° angle and its associated wedge is inclined at a substantially 44° angle.

8. The balanced three-way valve defined in claim 1 wherein the seating ring is of a wedge-shaped cross section loosely positioned within a wall of the body and at a position that is immediately under a peripheral end portion formed by said beveled end of the cage means, said peripheral end portion of said cage means being inclined at a different angle than an inclined peripheral surface forming said wedge-shaped ring, and said cage-moving means is employed to move the beveled portion of the cage means into peripheral compressed engagement with the inclined surface of the wedge to thereby provide a fluidtight seal between the external peripheral end portion of the cage means and a wall of the body and the difference in said beveled shaped angle of said cage means and the angle at which said inclined surface is formed on the wedge-shaped seating ring enables the material of the ring to be forced in an outward direction against said inner surface of the body during said movement of the movable means and wherein each of said beveled shaped end of the cage is at a substantially 45° angle and the wedge associated with said cage means is inclined at a substantially 44° angle.

9. The balanced three-way valve defined in claim 1 wherein the seating ring is of a wedge-shaped cross section loosely positioned within a wall of the body and at a position that is immediately under a peripheral end portion formed by said beveled end of the cage means, said peripheral end portion of the cage means being inclined at a different angle than an inclined peripheral surface forming said wedge-shaped ring, and said cage-moving means is employed to move the beveled end portion of the cage means into peripheral compressed engagement with the inclined surface of the wedge to thereby provide a fluidtight seal between the external peripheral end portion of the cage and a wall of the body and wherein a flexible force applying ring is employed between the end of a bonnet connected to the body and the end of the cage means to enable said cage means to be slidably elongated in a direction along a wall formed by an inner wall surface of the body upon the occurrence of an increase in temperature of the fluid passing through said valve without the end of the cage means being brought into distorted contact with the body and said bonnet.

10. The balanced three-way valve defined in claim 1 wherein the seating ring is of a wedge-shaped cross section loosely positioned within an inner wall of the body and at a position that is immediately under a peripheral end portion formed by said beveled end of the cage means, said peripheral end portion being inclined at a different angle than an inclined peripheral surface forming said wedge-shaped ring, said cage-moving means is employed to move the beveled portion of the cage means into peripheral compressed engagement with the inclined surface of the wedge to thereby provide a fluidtight seal between the external peripheral end portion of the cage and an inner wall of the body, said beveled shaped angle of said cage means and the angle at which said inclined surface is formed on the wedge-shaped seating ring differing from one another to enable the material of the ring to be forced in an outward direction against said inner surface of the body during said movement of the movable means and wherein a flexible ring of an inverted funnel shape is employed between the end of a bonnet connected to the body and the end of the second cage to enable said cages to be slidably elongated in a direction along a wall formed by the inner wall surface of the body upon the occurrence of an increase in temperature of the fluid passing through said valve without the end of the cages being brought into distorted contact with one another and with the body and the bonnet.

* * * * *